(12) United States Patent
Chapman

(10) Patent No.: US 9,638,986 B1
(45) Date of Patent: May 2, 2017

(54) MOBILE BASE FOR A CAMERA CRANE

(71) Applicant: CHAPMAN/LEONARD STUDIO EQUIPMENT, INC., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 78 days.

(21) Appl. No.: 14/931,068

(22) Filed: Nov. 3, 2015

(51) Int. Cl.
  *G03B 17/56* (2006.01)
  *F16M 11/28* (2006.01)
  *F16M 11/42* (2006.01)
  *B62D 5/04* (2006.01)

(52) U.S. Cl.
  CPC ......... *G03B 17/561* (2013.01); *B62D 5/0421* (2013.01); *F16M 11/28* (2013.01); *F16M 11/42* (2013.01); *F16M 2200/08* (2013.01)

(58) Field of Classification Search
  None
  See application file for complete search history.

(56) References Cited

U.S. PATENT DOCUMENTS

| | | | |
|---|---|---|---|
| 3,022,901 A * | 2/1962 | Fisher | G03B 17/563 91/41 |
| 5,312,121 A | 5/1994 | Chapman | |
| D361,587 S | 8/1995 | Chapman | |
| D378,156 S | 2/1997 | Chapman | |
| D379,017 S | 4/1997 | Chapman | |
| 5,704,623 A | 1/1998 | Chapman | |
| 6,109,626 A | 8/2000 | Chapman | |
| 6,439,515 B1 * | 8/2002 | Powers | F16M 11/28 248/129 |
| 6,513,769 B1 * | 2/2003 | Chapman | F16F 15/073 248/125.1 |
| 6,520,642 B1 | 2/2003 | Chapman | |
| 6,719,307 B1 | 4/2004 | Chapman | |
| 7,544,001 B2 | 6/2009 | Chapman | |
| 8,322,858 B2 | 12/2012 | Chapman | |
| 8,550,632 B2 | 10/2013 | Chapman | |
| 8,684,530 B2 | 4/2014 | Chapman | |
| 8,733,478 B2 | 5/2014 | Chapman | |
| 9,057,481 B1 * | 6/2015 | Chapman | F16M 11/42 |
| 2012/0018596 A1 * | 1/2012 | Valles Navarro | B66F 11/048 248/161 |

OTHER PUBLICATIONS

Chapman/Leonard Studio Equipment, Inc., 2008-2010 Product Catalog, "CS Base (Crane & Remote Arm Base)", Item No. 4200, pp. 92-93 (2008-2010).

(Continued)

*Primary Examiner* — W B Perkey
(74) *Attorney, Agent, or Firm* — Kenneth H. Ohriner; Perkins Coie LLP

(57) ABSTRACT

A camera crane mobile base has a chassis including a front and rear wheel frames joined to a frame body via front and rear frame arms. Axle assemblies are pivotally attached at opposite ends of the wheel frames. A wheel is mounted onto each axle assembly. Front and rear steering systems have linkages pivotally attached to the axle assemblies and to upper and lower steering arms. A post frame is pivotally attached to a frame body with a center post pivotally attached to the post frame.

20 Claims, 6 Drawing Sheets

(56) References Cited

OTHER PUBLICATIONS

Chapman/Leonard Studio Equipment, Inc., 2008-2010 Product Catalog, "Super CS Base (Crane & Remote Arm Base)", Item No. 4250, pp. 94-95 (2008-2010).
Chapman/Leonard Studio Equipment, Inc., 2008-2010 Product Catalog, "Ultra CS Base (Crane & Remote Arm Base)", Item No. 4255, pp. 96-97 (2008-2010).
Chapman/Leonard Studio Equipment, Inc., 2008-2010 Product Catalog, "ATB (All Terrain Base)", Item No. 3910, pp. 98-99 (2008-2010).

* cited by examiner

MOBILE BASE FOR A CAMERA CRANE

BACKGROUND OF THE INVENTION

Camera cranes are used to position and maneuver motion picture or video cameras. Camera cranes typically have a crane arm mounted onto a mobile base or vehicle, with a camera platform at one end of the crane arm, and counterweights at the other end of the arm. The crane arm can be pivoted or tilted up or down, and panned from side to side, to obtain a desired camera position, while the mobile base remains stationary. Some camera crane arms can also extend telescopically. These movements allow a camera on a platform at the front end of the arm to move into a wide range of positions. To follow a moving subject during filming, or to move the camera around a subject, or move diagonally in any direction, the motion base is pushed and steered by a film crew. The motion base may also be moved on tracks, if the ground or floor is too irregular for smooth filming.

As filming often takes place outside of a studio (on location), the mobile base is advantageously portable, so that, if necessary, it can be carried to the filming location by the film crew. Accordingly, the mobile base is advantageously light weight and compact. On the other hand, the mobile base should be able to provide a steady platform for supporting and moving a camera crane arm. To reduce the rolling friction and noise resulting from tire scrubbing when steered on a curved path, mobile bases often have steering transmissions intended to provide geometrically corrected steering. While various mobile camera crane bases have successfully been used in the past, there remains a need for an improved mobile camera crane base which can be easily transported, provides advantageous steering characteristics, is quickly adaptable for both ground and track use, and which provides a stable vehicle for a camera crane arm.

SUMMARY OF THE INVENTION

A camera crane mobile base has a chassis including a front and rear wheel frames joined to a frame body via front and rear frame arms. Axle assemblies are pivotally attached at opposite ends of the wheel frames. A wheel is mounted onto each axle assembly. Front and rear steering systems have linkages pivotally attached to the axle assemblies and to upper and lower steering arms. A post frame is pivotally attached to a frame body with a center post pivotally attached to the post frame.

DETAILED DESCRIPTION OF THE DRAWINGS

Figure 1:
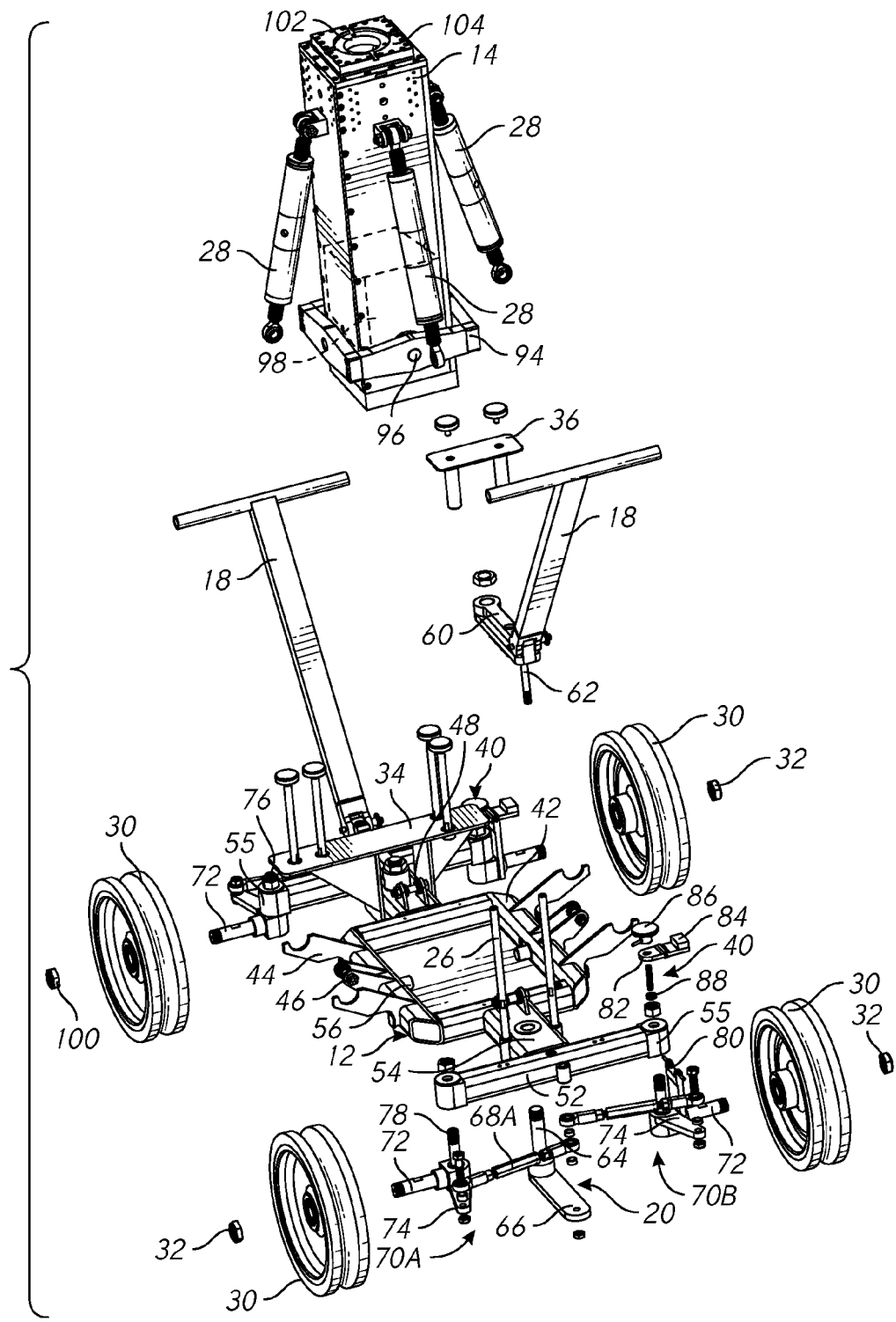
FIG. 1 is an exploded view of the mobile base of FIG. 1 with elements removed for purpose of illustration.

Turning now in detail to the drawings, as shown in FIG. 1, a mobile base 10 for a camera crane has a chassis 12 having a rectangular or square frame body 42. First and second frame arms 54 are centrally attached to each of the shorter sides of the frame body 42. First and second wheel frames 52 are attached to the outer end of the first and second frame arms 54. Shaft receptacles 55 are provided at the opposite ends of each wheel frame 52. Lateral turnbuckle arms 46 are centrally located on the longer sides of the frame body, with longitudinal turnbuckle arms 48 centrally located on the shorter sides of the frame body, or on the frame arms 54. Collar hubs 56 project inwardly from the longer sides of the frame body 42, with the collar hubs centrally located on the chassis 12. Referring still to FIG. 1, hook arms 44 having up facing hooks may be attached onto the longer sides of the frame body 42, on opposite sides of the lateral turnbuckle arms 46.

The chassis 12 may be provided as a weldment of steel or aluminum tubes, with the frame body 42, frame arms 54, wheel frames 52, shaft receptacles 55, collar hubs 56 and the lateral and longitudinal turnbuckle arms 46 and 48 forming an integral welded unit. The chassis 12 may be symmetrical about its lateral and longitudinal centerlines, so that either end may be the front, with the other end being the rear, and a mirror image of the front. Similarly, either side of the chassis 12 may be the left side, with the other side being the right side and a mirror image of the left side.

Figure 2:
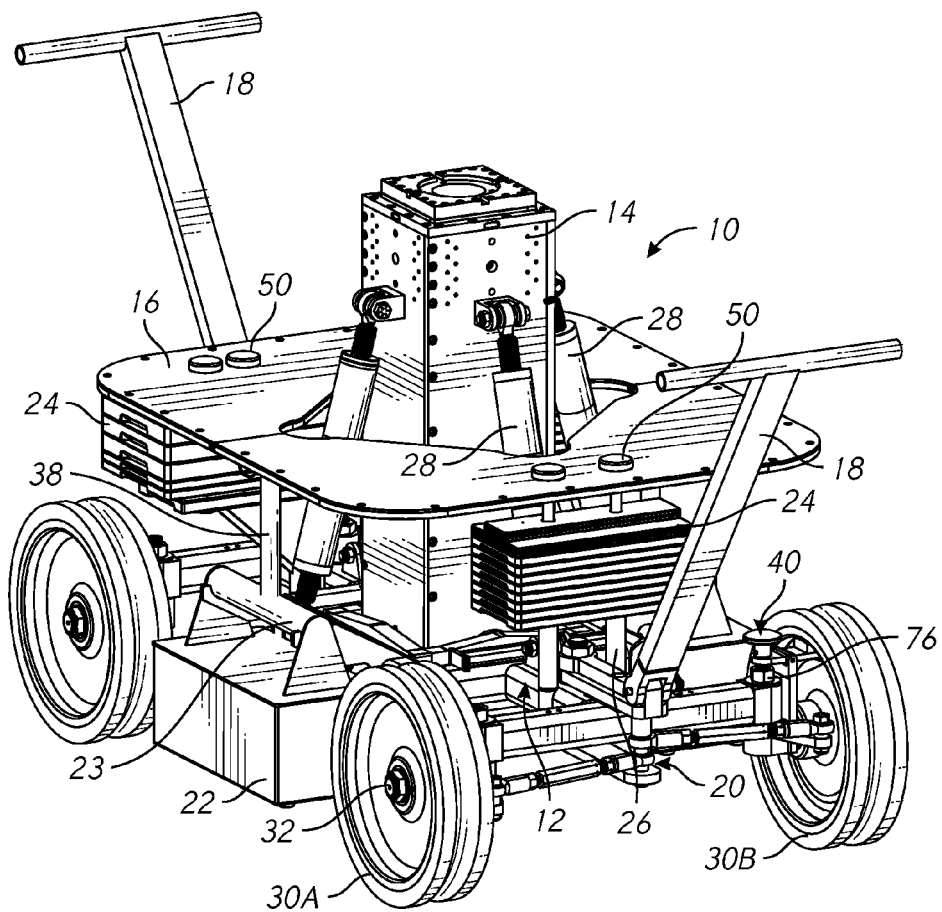
FIG. 2 is a front and right side perspective view of the mobile base of FIG. 1.
Figure 3:
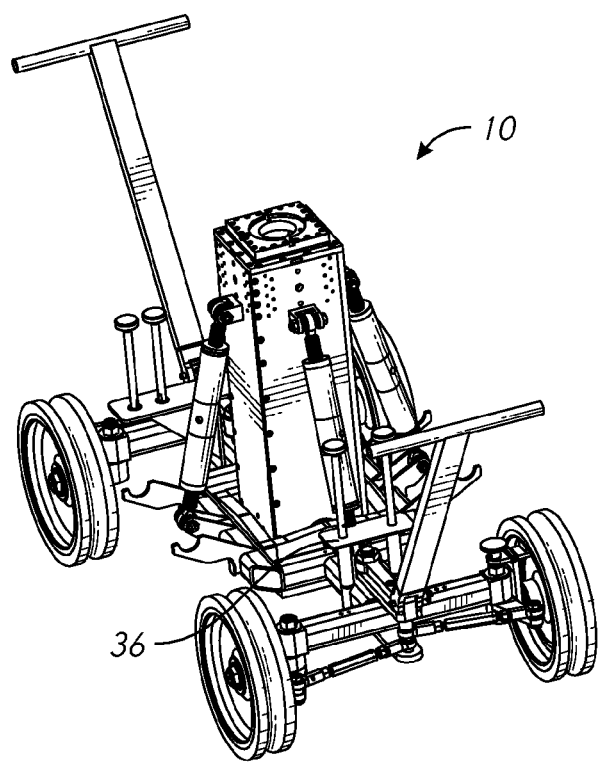
FIG. 3 is an alternative perspective view of the mobile base as shown in FIG. 2.

Some camera crane arms use separate trim weights or counterweights which are typically loaded onto the back end of the camera arm to balance the arm. The counterweights are often provided in the form of lead weights. Referring now also to FIGS. 2 and 3, to allow counterweights 24 to be conveniently carried on the mobile base 10, a first weight plate platform 34 is optionally attached to the first frame arm 54 and a second weight plate platform 36 is optionally attached to the second frame arm 54. In this design, platform posts 26 on the platforms 34 and 36 extend up from the weight plate platforms 34 and 36 through holes in the counterweights 24 to secure the counterweights onto the platforms. The weight plate platforms 34 and 36 are shown having different configurations in the figures, so that the mobile base 10 is not entirely symmetrical in the longitudinal or front/back axis. However, symmetrical or identical weight plate platforms may alternatively be used, or the weight plate platforms may be omitted.

As shown in FIGS. 1-3, a post frame 94 has lateral and longitudinal legs joined into a square around a center post 14. The center post 14 is pivotally supported on a longitudinal axle 96 attached to the lateral legs. The longitudinal legs are pivotally supported on the collar hubs 56. The upper ends of lateral turnbuckles 28 are pivotally attached to the sides of the center post 14. The lower ends of the lateral turnbuckles 28 are pivotally attached to the lateral turnbuckle arms 46. Similarly, the upper ends of longitudinal turnbuckles 28 are pivotally attached to the front and back of the center post 14.

The lower ends of the longitudinal turnbuckles 28 are pivotally attached to the longitudinal turnbuckle arms 48. As a result, the center post 14 may be tilted in the front/back or longitudinal axis, and in the left/right or lateral axis, by turning the central body of the turnbuckles 28. This allows the center post 14 to be adjusted into a vertical orientation if the chassis 12 is not level, for example if the mobile base 10 is on an incline. Bubble levels on the center post may be used to move the center post into a vertical position.

As shown in FIG. 1, a column 102 is telescopically moveable up from the center post 14 via an electric worm drive 98 linked to the column for raising and lowering the column. The camera crane arm may be mounted onto a column plate 104 on the top of the column 102. A recess in one side of the column provides access to the bottom of the column plate 104 for this purpose. Via operation of the worm drive 98, the column 102 may move up and down over a range typically of 25 to 50 cm. FIGS. 1-3 shown the column in the down or fully retracted position. A switch on the center post may be used to control the electric worm drive 98.

In FIGS. 1 and 2, for purpose of explanation, the front end of the mobile base 10 is the end in the foreground, although in use either end may be the front or the back. A steering system 20 at the front end of the mobile base 10 includes left and right axle assemblies 70A and 70B, each having an axle 72, a control arm 74 and a shaft 78 perpendicular to the axle 72. The threaded upper end of the shaft 78 of each axle assembly extends through a bearing in the shaft receptacle 55 and is secured via a nut 76, to pivotally attach the axle assemblies 70A and 70B to the chassis 12. A left linkage 68A is pivotally attached to the control arm 74 on the left axle assembly 70A and to a lower steering arm 66. A right linkage 68B is pivotally attached to the control arm 74 on the right axle assembly 70B and to an upper steering arm 60. The upper steering arm 60 is rigidly connected to the lower steering arm 66 via a steering shaft 64 extending through the frame arm 54.

Figure 8:
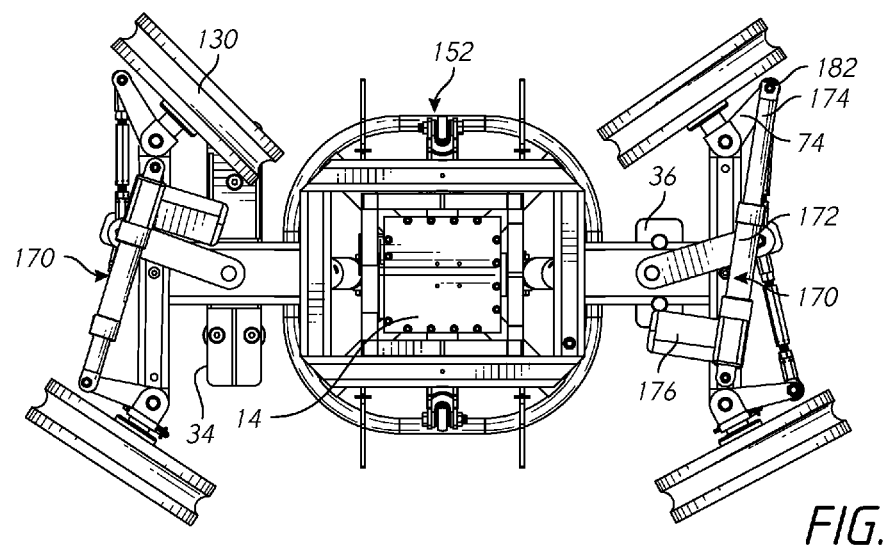
FIG. 8 is a bottom view of the mobile base shown in FIG. 7 in round steering mode.

A push and steering handle 18 is pivotally attached to the upper steering arm 60. The linkages 68A and 68B and the other components of the steering system 20 are permanently connected to each other in the sense that the steering system 20 has no adjustments. Rather the geometry of the steering system is based on an average position between corrective steering and round steering. Round steering is shown in FIG. 8. Both steering systems may be steered to the same steering angle to provide so-called square or crab steering. Hence the steering system provides a fixed amount of corrective steering for any given steering angle, which is generally sufficient for most uses of the mobile base. Principles of steering correction, round steering and crab steering are described in my U.S. Pat. Nos. 5,174,593 and 5,704,623, incorporated herein by reference.

As shown in FIG. 1, wheel 30 is held in place on each axle 72 via a wheel nut 32. The four wheels 30 on the mobile base 10 may all be the same, with the wheels in FIG. 2 referred to as 30A and 30B only to indicate a left/right side position. The front end of the mobile base 10 may be steered via the handle 18. As the steering handle is moved e.g. to the left, the upper and lower steering arms 60 and 66 are correspondingly moved to the left, which causes the front wheels 30 to steer to the left via the upper and lower steering arms acting on the linkages 68A and 68B and the axle assemblies 70A and 70B. The geometry of the steering system 20 determined in part via the relative positions of the attachment points between the control arms and the linkages, provides corrective steering, i.e., causes the inner wheel to turn to a sharper steering angle than the outer wheel.

As shown in FIG. 1, a lockout pin 62 may be inserted through the upper steering arm 60 into a hole in the wheel frame 52 to lock the steering system 20 into a straight ahead position. The lockout pin 62 may optionally be spring loaded to automatically lock the steering system into the straight ahead position when the upper steering arm 60 is returned to the straight ahead position. For corrective steering using only one of the handles 18, the pin 62 may be installed in the steering system 20 at the back end of the mobile base and removed from the steering system 20 at the front end.

The width of the frame arm 54 is 15% to 30% of the width of the frame body 42 and correspondingly has an angular moment of inertia of 20% to 50% of the angular moment of inertia of the frame body 42. As a result, the chassis 12 has a limited amount of built in flexibility. Specifically, if a wheel 30 rolls over a bump or into a depression, the wheel frame 52 exerts a twisting force on the chassis 12, causing primarily the frame arm 54 to momentarily angularly deflect. This deflection helps to keep all four wheels on the ground, in contrast to a more rigid chassis where for example, the left rear wheel lifts off of the ground when the left front wheel rolls over a bump.

As shown in FIGS. 1 and 2, a brake 40 may be provided at both left side wheels 30B. If used, the brake may include a brake frame 80 attached to the left side axle assemblies 70B, and a brake lever 82 pivotally attached to the brake frame 80. A brake pad 86 on the outer end of the brake lever 82 is aligned with the rim of the left side wheel 30B shown in FIG. 2. A brake knob 86 has a threaded stud extending through the inner end of the brake lever 82 and into a brake nut 76. Turning the brake knob 86 clockwise draws the brake knob down forcing the brake pad 86 up into engagement with the rim, to apply braking force to the wheel 30B. A steering system 20 and a brake 40 as described above relative to the front of the mobile base 10 are also provided at the back of the mobile base. By steering the front and back wheels to maximum opposite angles, the mobile base 10 can turn around with in a 210 cm circle.

Referring once again to FIG. 1, when rolling on track, friction is reduced if the lateral wheel base can change slightly as the mobile base 10 moves from straight track to curved track. To achieve this result, for use on track, each wheel nut 32 on the right side of the mobile base 10 may be removed and replaced with a track cap 100 which allows the right side wheels 30A to shift laterally, while still retaining the wheels 30A on the axles 72. The wheels on the left side are not changed so that the brake pad 86 remains aligned with the rim of the left wheel, at the front and at the back of the mobile base 10.

As shown in FIG. 2, first and second boxes, such as a battery and an electronics box 22, each has a handle 23 adapted to hang on the hook arms 44, on each sides of the mobile base 10. A battery in the battery box 22 may be connected to the worm drive 98 and/or to the steering actuator shown in FIGS. 7-8 via a cable or connector. The battery may also be connected to a crane arm mounted on the column 102. FIG. 2 also shows two types of counterweights are loaded onto the weight plate platform 34 and 36.

A standing platform 16 may also be provided in two sections which engage each other via a tongue in groove design. The standing platform sections are supported on folding legs 38 which fold down from the bottom surfaces of the standing platform sections, with the lower end of each folding leg 38 secured onto the handle 23 of the battery or electronics box 22, on each side of the mobile base 10. The standing platform sections are also supported from below on shoulders of the platform posts 26. Platform knobs 50 are screwed onto the upper threaded ends of the platform posts 26. Consequently, when installed, the standing platform 16 is rigidly secured in place on the mobile base 10. The standing platform 16 is removed during loading or unloading counterweights, or when not needed.

Figure 4:
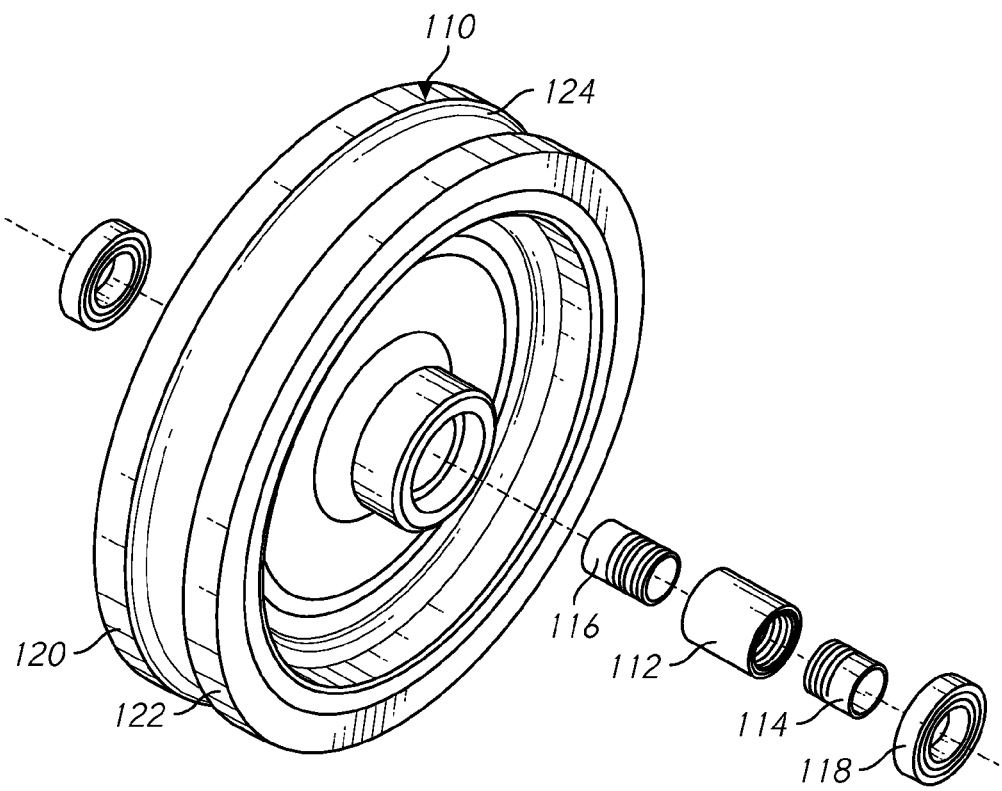
FIG. 4 is an exploded perspective view of a wheel of the mobile base.

Turning to FIG. 4, each wheel 30 may have a solid hard plastic tire on a metal rim. The tire generally has a center groove 124 between an outer rolling surface 120 and an inner rolling surface 122. The center groove is dimensioned to fit industry standard track. The inner and outer surfaces 120 and 122 are flat. The diameter of the inner rolling surface 122 may be 2 to 2.4 mm less than the outer rolling surface 120, when using a 92 shore hardness urethane tire. As a result, the mobile base 10 may be steered with significantly less force than with standard wheels having equal rolling surface diameters. The difference between the diameters of the inner and outer rolling surfaces may of course be adjusted depending on the tire characteristics. The diameter of the outer rolling surface may typically be about 320 mm.

Also as shown in FIG. 4, first and second DU bushings 114 and 116 are threaded into opposite ends of a spacer sleever 112 between inner and outer wheel bearings. The spacer 112 prevents axial loading on the bearings 118, regardless of the torque applied to the wheel nut 32. This allows the wheels 30 to rotate freely on the bearings even if the wheel nuts 32 are inadvertently over tightened.

Figure 5:
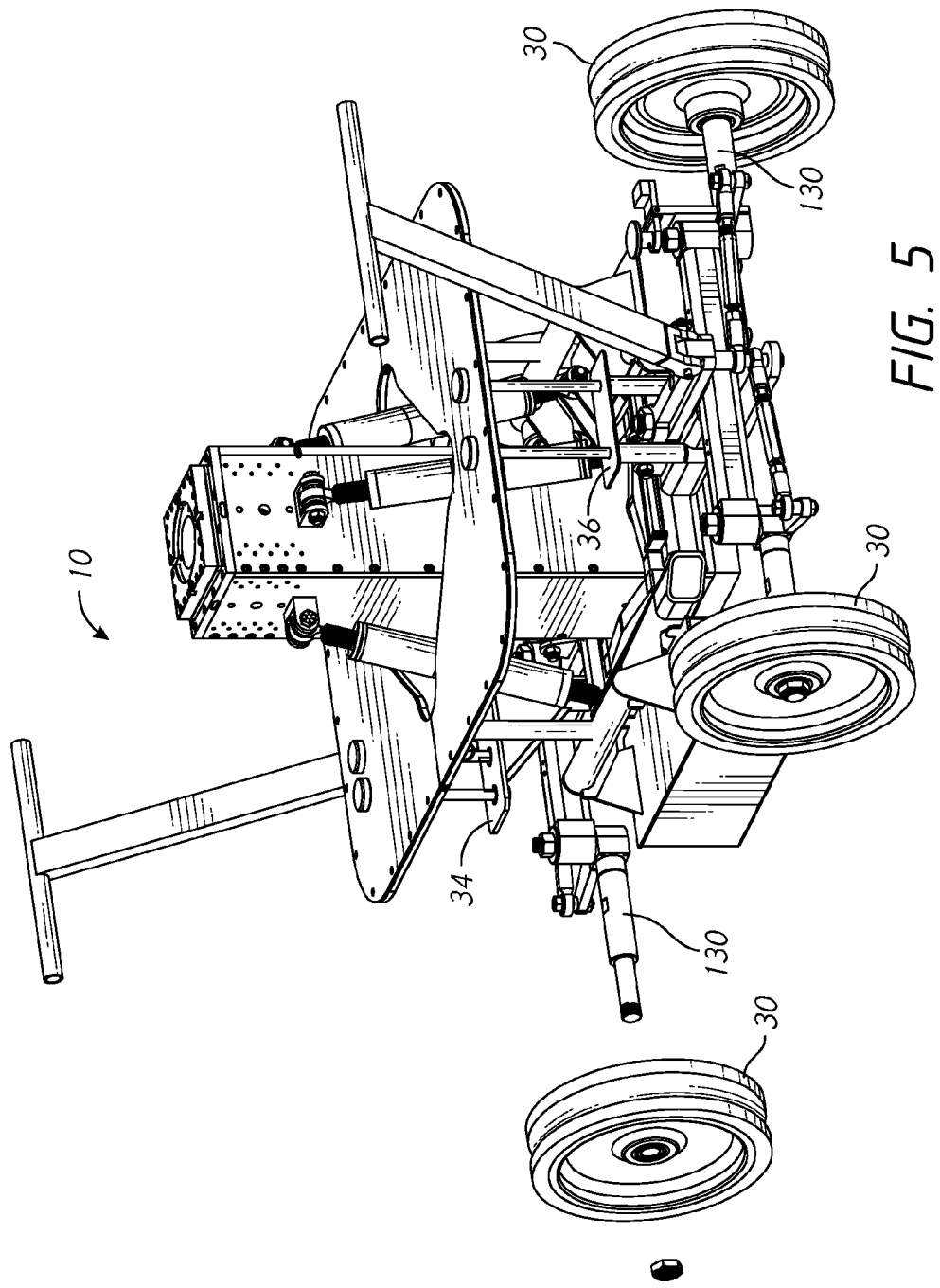
FIG. 5 is a perspective view of the mobile base of FIG. 1 having axle extensions for use on a wide gauge track.

The lateral wheel spacing of the mobile base as configured in FIGS. 1-3 is generally selected to fit on standard track having tubular rails spaced apart by 620 mm. Referring to FIG. 5, the mobile base 10 may be adapted for use with other track dimensions via use of axle extensions 130. The axle extensions 130 are installed by removing the wheel nuts 32 and/or the track caps 100, and the wheels 3, and then threading the axle extensions 130 onto the axles 72. The wheels 30 are then placed onto the axle extensions 130 and secured by the wheel nuts 32 on the left side and the track caps 100 on the right side. An extended brake lever 82 may be used in this configuration so that the brakes 40 may be used when the axle extensions 130 are on the mobile base 10.

Figure 6:
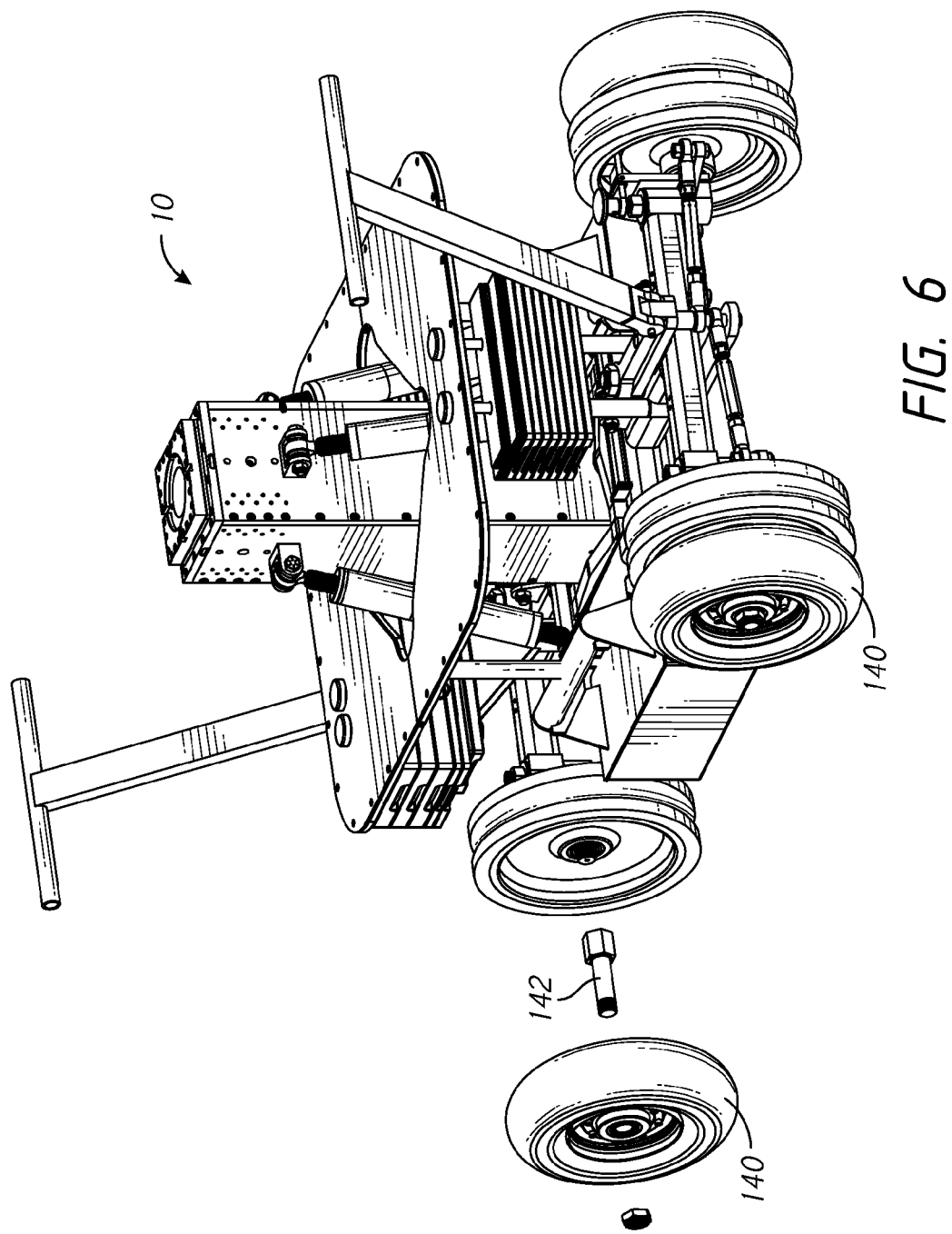
FIG. 6 is a perspective view of the mobile base of FIG. 1 with optional soft ground tires installed.

The hard plastic tire shown in FIG. 4 is designed for use on track or on a hard floor or ground surface. As shown in FIG. 6, for using the mobile base 10 on sand, grass or other soft or uneven surfaces, soft outer wheels 140 having a softer tire, such as a pneumatic tire, may be used. In this case, the wheel nuts 32 are removed, with the wheels 30 optionally left on the axles 72. Axle extensions 142 are then threaded onto the axles 72 and the soft outer wheels 140 installed onto the axle extensions 142 and are held onto the axle extensions via the wheel nuts 32.

In the configuration shown in FIGS. 1-3, the lateral wheelbase is 620 mm, and the total width of the mobile base 10 is nominally larger. The mobile base 10 can therefore fit through most commercial and industrial doorways. The longitudinal wheelbase is 100% to 200% of the lateral wheelbase. The mobile base 10 typically weighs 80-120 kg, without the counterweights and battery boxes. Various types of camera crane arms may be mounted on the column, including fixed length arms, for example as described in my U.S. Pat. No. 7,037,006, and telescoping arms, for example as described in my U.S. patent application Ser. No. 14/683,931, incorporated herein by reference.

Figure 7:
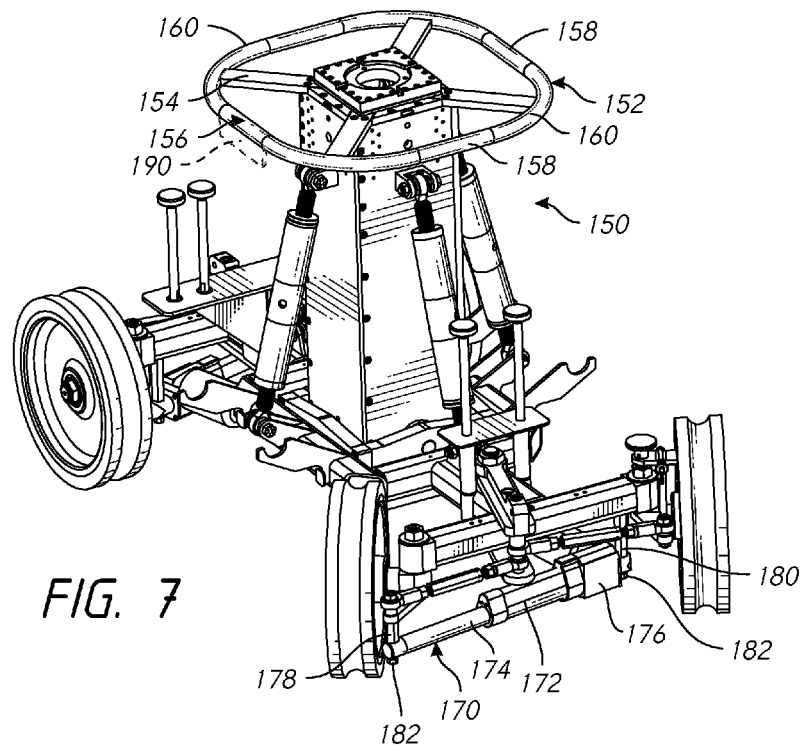
FIG. 7 is a top and side perspective view of an alternative embodiment.

FIGS. 7-8 show an alternative design that may be the same as the mobile base in FIGS. 1-6 except as described below. As shown in FIG. 7, a handle 152 is attached to or near the top of the center post 14. The handle 152 is provided with a ring 156 having straight sections 158 joined to curved sections at the corners. The straight sections 158 may be geometrically straight, or alternatively the straight sections may be relatively straight in the sense that the straight sections 158 have less curvature than the curved sections, with the ring 156 then forming more of an oval or elliptical shape. The ring 156 is rigidly attached to the center post 14 via spokes 154. The handle 152 provides a convenient gripping location for the hands of the operator of the mobile base 10. The operator can then push or pull the mobile base 10, without using the handle 18. As shown in FIG. 7, the handle ring 156 is sufficiently close to the center post 14 so that it does not interfere with camera crane arm mounted on the center post 14, even with the camera crane arm at maximum and minimum elevation angles.

Referring still to FIGS. 7-8, a steering actuator 170 may be provided at one or both ends of the mobile base 10. As shown in FIG. 7, the cylinder or housing 172 of the steering actuator 170 is pivotally attached to a chassis post 180 on the bottom of the chassis 12. The outer end of a driver 174 of the steering actuator 170 is pivotally attached to a driver post 178 on the control arm 74. An electric motor 176 in the housing 172 moves a driver 174 linearly into and out of the housing, as controlled by a controller 190, to control the steering system 20. Movement of the driver 174 directly steers the wheel 30 on the right side of the mobile base 10 as shown in FIG. 7. The linkages 68A and 68B cause the wheel on the left side to steer to a corresponding corrected steering angle. As shown in FIG. 8, the configuration of steering actuator 170 at the front or first end of the mobile base 10 is a mirror image of the steering actuator 170 at the back or second end of the mobile base 10.

The controller 190 is electrically connected to the motor 176 via a cable to provide electrical power and control signals to the motor 176. Alternatively, the controller 190 may control the motor 176 via a wireless connection, with the motor 176 powered by a local or dedicated battery, or with the motor powered via a cable connected to a battery in the battery box 22, or another on-board battery. The controller 190 may be attached to the handle 152 or the center post, with or without a cable tether, or the handle may be provided as a remote unit.

Post nuts 182 or similar fasteners hold the outer end of the driver 174 and the cylinder 172 onto the posts 178 and 180. The steering actuator 170 may be quickly removed from the mobile base 10 by disconnecting the cable, if any, to the steering actuator 170, removing the post nuts 182 and sliding the actuator off of the posts 178 and 180. As shown in FIG. 8, for most uses a steering actuator 170 is provided onto the steering system 20 at both ends of the mobile base 10.

Generally, the handles 18 are removed when the steering actuators 170 are used. The lock out pin 62 is typically also removed as the steering actuator effectively locks the steering system 20 since the steering actuator 170 cannot be back-driven. As a result, with the steering actuator 170 installed, the steering angle of the wheels 30 cannot be changed without operating the steering actuator 170.

Thus, a novel mobile base has been shown and described. Various changes and substitutions may of course be made without departing from the spirit and scope of the invention. The invention, therefore, should not be limited, except by the following claims and their equivalents.

The invention claimed is:
1. A camera crane mobile base comprising:
a chassis including a frame body having first, second, third and fourth sides, with the first side parallel to the third and the second side parallel to the fourth side;
a first frame arm joined to the first side of the frame body;
a second frame arm joined to the third side of the frame body;
a first wheel frame joined to the first frame arm, with the first frame arm perpendicular to the first wheel frame and to the first side of the frame body;

a second wheel frame joined to the second frame arm, with the second frame arm perpendicular to the second wheel frame and to the third side of the frame body;

first and second axle assemblies pivotally attached at opposite ends of the first wheel frame;

third and fourth axle assemblies pivotally attached at opposite ends of the second wheel frame;

a first steering system having first and second linkages pivotally attached to the first and second axle assemblies and to first upper and lower steering arms, respectively;

a second steering system having third and fourth linkages pivotally attached to the third and fourth axle assemblies and to second upper and lower steering arms, respectively;

first, second, third and fourth wheels rotatably attached onto the first, second, third and fourth axle assemblies, respectively;

a post frame pivotally attached to the second and fourth sides of the frame body; and a center post pivotally attached to the post frame.

2. The mobile base of claim 1 with each wheel having a tire having inner and outer rolling surfaces spaced apart by a groove, and with the outer rolling surface having a diameter greater than the inner rolling surface.

3. The mobile base of claim 1 wherein the chassis is symmetrical about a centerline passing through the second and fourth sides of the frame body.

4. The mobile base of claim 1 further including a column telescopically mounted within the center post, and an electric worm drive linked to the column for raising and lowering the column.

5. The mobile base of claim 1 further including first and second arm hooks on the second side of the frame body and third and fourth arm hooks on the fourth side of the frame body, and a first box supported on the first and second arm hooks and a second box supported on the third and fourth arm hooks.

6. The mobile base of claim 1 further including a first weight plate platform attached to the first frame arm and a second weight plate platform attached to the second frame arm.

7. The mobile base of claim 1 further including a standing platform around the center post having a first section engageable into a second section.

8. The mobile base of claim 1 further including a first, second, third and fourth turnbuckles each having an upper end pivotally attached to the center post and each having a lower pivotally attached to the first, second, third and fourth sides of the frame body, respectively.

9. The mobile base of claim 1 with wheel nuts holding the second and third wheels onto the second and third axle assemblies, respectively, and with the second and third axle assemblies each having a brake assembly including a brake pad engageable to the second and third wheels, and with track caps holding the first and fourth wheels onto the first and fourth axle assemblies, for allowing lateral movement of the first and fourth wheels during use on curved track.

10. The mobile base of claim 1 with the first, second, third and fourth wheels each having a groove between an outer rolling surface and an inner rolling surface, and with the inner rolling surface having a diameter less than the diameter of the outer rolling surface.

11. The mobile base of claim 1 wherein the first and second steering systems each provides a fixed steering angle correction based on an average of corrective steering and round steering.

12. The mobile base of claim 1 wherein each wheel has first and second bushings threaded into a spacer sleeve between inner and outer wheel bearings.

13. The mobile base of claim 1 with the upper and lower steering arms of the first steering system rigidly connected to each other via a first steering shaft extending through the first frame arm.

14. The mobile base of claim 1 wherein the first frame arm is 30% to 50% of the length of the second side of the frame body.

15. The mobile base of claim 1 further including a first steering handle pivotally attached to the first steering arm of the first steering system, and a second steering handle pivotally attached to the first steering arm of the second steering system.

16. The mobile base of claim 1 further including first, second, third and fourth axle extensions threaded onto axles on the first, second, third and fourth axle assemblies, and first, second, third and fourth soft wheels rotatably attached onto the first, second, third and fourth axle extensions, respectively.

17. The mobile base of claim 1 with the first, second, third and fourth axle assemblies each including an axle and an axle extension attached onto the axle, and with the first, second, third and fourth wheels mounted on the first, second, third and fourth axle extensions, to widen the wheelbase of the mobile base.

18. The mobile base of claim 1 further including a handle attached to the center post, with the handle having a ring including relatively straight sections joined to curved corner sections.

19. The mobile base of claim 1 further including a steering actuator having a housing pivotally attached to the chassis and a driver pivotally attached to the first axle assembly, with the steering actuator including an electric motor for linearly moving the driver.

20. A camera crane mobile base comprising:

a chassis;

first, second, third and fourth axle assemblies pivotally attached at first, second, third and fourth corners of the chassis;

a first steering system having first and second linkages pivotally attached to the first and second axle assemblies and to a first steering arm;

a second steering system having third and fourth linkages pivotally attached to the third and fourth axle assemblies and to second steering arm;

first, second, third and fourth wheels rotatably attached onto the first, second, third and fourth axle assemblies, respectively, with the first, second, third and fourth wheels each having a groove between an outer rolling surface and an inner rolling surface, and with the inner rolling surface having a diameter less than the diameter of the outer rolling surface;

a post frame pivotally attached to the chassis; and a center post pivotally attached to the post frame.

* * * * *